US012435698B2

(12) United States Patent
Wenderby

(10) Patent No.: US 12,435,698 B2
(45) Date of Patent: Oct. 7, 2025

(54) SEAL ASSEMBLY FOR A ROD OF A PITCH ACTUATOR OF A WIND TURBINE, AND PITCH ACTUATOR OF A WIND TURBINE

(71) Applicant: DELLNER HYDRATECH GROUP, Vraa (DK)

(72) Inventor: Jimmi Wenderby, Vraa (DK)

(73) Assignee: DELLNER HYDRATECH GROUP, Vraa (DK)

( * ) Notice: Subject to any disclaimer, the term of this patent is extended or adjusted under 35 U.S.C. 154(b) by 0 days.

(21) Appl. No.: 18/711,103

(22) PCT Filed: Nov. 19, 2021

(86) PCT No.: PCT/IB2021/060737
§ 371 (c)(1),
(2) Date: May 16, 2024

(87) PCT Pub. No.: WO2023/089365
PCT Pub. Date: May 25, 2023

(65) Prior Publication Data
US 2025/0020102 A1    Jan. 16, 2025

(51) Int. Cl.
*F03D 7/02* (2006.01)
*F15B 15/14* (2006.01)
(Continued)

(52) U.S. Cl.
CPC ........ *F03D 7/0224* (2013.01); *F15B 15/1433* (2013.01); *F15B 15/1461* (2013.01);
(Continued)

(58) Field of Classification Search
CPC .... F03D 7/0224; F03D 1/0667; F03D 1/0669; F03D 17/029; F16J 15/002; F16J 15/56;
(Continued)

(56) References Cited

U.S. PATENT DOCUMENTS 2,413,504 A * 12/1946 Kemmerling .......... F16J 15/188
277/500
3,540,741 A    11/1970 Lefebvre
(Continued)

FOREIGN PATENT DOCUMENTS

CN    110259758    9/2019
EP    1931898      6/2008
(Continued)

OTHER PUBLICATIONS

International Search Report and Written Opinion Jul. 27, 2022 from corresponding PCT Application No. PCT/IB2021/060737.

*Primary Examiner* — Courtney D Heinle
*Assistant Examiner* — Jesse M Prager
(74) *Attorney, Agent, or Firm* — ArentFox Schiff LLP

(57) ABSTRACT

Present disclosure discloses a seal assembly for an actuator rod of a pitch actuator. The assembly includes at least one first ring annularly interposed between an actuator rod and a cylinder cover, and removably supported by a first split retainer half pair in an annular recess defined in the cylinder cover. A first seal is annularly interposed between the actuator rod and the cylinder cover. A second seal annularly is interposed between the actuator rod and the cylinder cover is supported by a retainer. The seal assembly also includes a wiper seal which is annularly interposed and supported by a third split retainer half pair between the actuator rod and the cylinder cover. Each of the first, second and third split retainer half pairs, and the retainer is removably connectable to the cover.

12 Claims, 4 Drawing Sheets

(51) Int. Cl.
  *F15B 21/00* (2006.01)
  *F16J 15/00* (2006.01)
(52) U.S. Cl.
  CPC ........... *F15B 21/003* (2013.01); *F16J 15/002* (2013.01); *F05B 2240/57* (2013.01); *F05B 2260/79* (2013.01)
(58) Field of Classification Search
  CPC . F16J 15/188; F05B 2240/57; F15B 15/1461; F15B 21/003; F15B 15/1433
  See application file for complete search history.

(56) References Cited

U.S. PATENT DOCUMENTS

| | | | | |
|---|---|---|---|---|
| 5,303,934 | A | * 4/1994 | Elliott | F16J 15/002 277/346 |
| 7,607,383 | B2 | 10/2009 | Nagel | |
| 2020/0200197 | A1 | 6/2020 | Hoshino | |

FOREIGN PATENT DOCUMENTS

| | | | | |
|---|---|---|---|---|
| GB | 524824 | A * | 8/1940 | ............... F16J 15/28 |
| JP | 2013024302 | | 2/2013 | |

\* cited by examiner

SEAL ASSEMBLY FOR A ROD OF A PITCH ACTUATOR OF A WIND TURBINE, AND PITCH ACTUATOR OF A WIND TURBINE

CROSS REFERENCE TO RELATED APPLICATION(S)

This application is a National Stage application filed under 35 U.S.C. 371 based on International Patent Application No. PCT/IB2021/060737, filed on Nov. 19, 2021, the disclosures of which is incorporated herein by reference in its entirety.

TECHNICAL FIELD

Present disclosure generally relates to the field of Wind Turbine technology. Particularly, but not exclusively, the present disclosure relates to pitch actuators for wind turbines. Further, embodiments of the present disclosure disclose a seal assembly for an actuator rod of a pitch actuator used in wind turbines.

BACKGROUND

Wind Turbine is a prime mover which converts power in the wind into electricity. The conversion essentially involves utilizing aerodynamic lift forces to produce a net positive torque on a rotating shaft, resulting first in generation of mechanical power, and then its transformation into electricity through a generator. Wind turbine blades have airfoil profiles that are best suited to generate lift forces. The blades are typically attached to a central hub, such that the hub together with the blades constitute a rotor. The rotor is set into rotation under the influence of the wind on the blades, characterized by changes in velocity (kinetic energy), pressure and several other factors associated with the wind motion. Wind characteristics like velocity, pressure, direction of flow, etc., are stochastic in nature due to which the wind blades are continuously turned or pitched for optimal orientation relative to wind direction. A pitch mechanism is typically employed to control the pitching of the blades relative to the hub. Pitching is extremely important to optimize the performance of the rotor and to keep the energy yield of the turbine at desired levels. Almost all modern-day wind turbines have pitch control mechanisms to control the pitch angles of the blades in response to wind characteristics. Such a wind turbine provided with a pitch control mechanism is known as pitch-controlled wind turbine. Apart from optimizing the energy yield, pitching also serves as an emergency brake in situations like extreme/dangerously high wind speeds where the blades are pitched out of wind. During this condition, the pitch mechanism reduces angle of attack of the blade so that lift force acting on the blades is reduced, and rotor is brought to standstill. When the wind speed reduces, the blades are turned back to their operational angles by the same pitching mechanism.

Pitch control in wind turbines is generally attained through pitch actuators which may include, but not limited to electric actuators and hydraulic actuators. Hydraulic actuators use pressure of a hydraulic fluid to linearly actuate a piston enclosed within a cylinder. The linear motion of the piston is transformed into rotary movement (pitching) of the blades. The hydraulic actuators may be of single acting or double acting type. Inside an actuator cylinder, a number of discrete components such as seals, lubrication pathways, glands, retainers, etc., are provided to ensure proper functioning of the piston. Since pitch actuators operate continuously to adjust the pitch angles of the blade in response to fluctuating wind conditions, there is continuous fluctuation of the pressure of the hydraulic fluid inside the actuator cylinder. Thus, the components inside the actuator cylinder are subjected to fluctuating hydraulic pressures. Especially, if the actuator is of double-acting cylinder type, hydraulic fluid pressure may alternately be imposed on either end of actuator front cover, in which case, the rod packing seals and gland at one end of the cylinder are subjected to full pressure of the operating fluid. In addition to high, fluctuating hydraulic pressures, the rod packing seals and glands are concurrently subjected to frictional forces due to piston movement. Once the seals, glands, etc., get damaged during the operating cycles or if the operating life of such seals, glands, etc., come to an end, they have to be replaced, which increases idle time of the wind turbine. Also, replacement of damaged seals, glands etc., is a tedious and an expensive process, demanding a highly skilled labor for the task and large maintenance overheads.

U.S. Pat. No. 7,607,383 discloses a system for backup rod seal for a hydraulic cylinder and a method for providing a back-up rod seal in said hydraulic cylinder. The method includes providing a primary seal acting between the cylinder head and the piston rod and providing a secondary seal acting between the cylinder head and the piston rod. The method also includes providing a back-up seal acting between the cylinder head and the piston rod. Then, the method involves defining a bypass channel so as to fluidically connect the working chamber with a chamber in the cylinder head between the back-up seal and the primary seal. The flow of hydraulic fluid through the bypass channel is allowed to equalize the pressure across said back-up seal when the back-up seal is not in service. The method involves placing the back-up seal in service by closing the bypass valve. Although this prior art, among others, unveils solutions to mitigate complications associated with replacing the rod seal system in an actuator, a satisfactory solution aimed at lessening the idle time, cost and tediousness involved in the replacement of seal systems is not evident or disclosed. Further, CN Patent No. 110259758 A discloses a self-adaption lateral-bending-wear-resisting oil cylinder structure comprising a cylinder barrel, a piston rod end structure and a piston end structure. A piston rod is arranged in the cylinder barrel. The piston rod end structure and the piston end structure between the cylinder barrel and the piston rod are provided with a separated type supporting structure and a seal structure correspondingly. The piston end structure is located at the end, close to the cylinder bottom, of the piston rod in the cylinder barrel. The piston rod end structure located at the other end of the piston rod is located at the cylinder barrel. A guide sleeve is arranged between a gland and the cylinder barrel. The seal structure is located between the guide sleeve and the piston rod. The self-adaption lateral-bending-wear-resisting oil cylinder structure has the beneficial effects that the independent seal structure is adopted and does not participate in support, a seal piece fluctuates along with the piston rod and the cylinder barrel, and the situation that the seal piece is stressed unilaterally can be effectively avoided; the independent support structure is adopted, so that a larger matching interval can be adopted, and the possibility that relative movement parts except a guide ring make contact due to flexure is effectively lowered.

Present disclosure is directed to overcome one or more limitations stated above, or other such limitations associated with the prior arts.

SUMMARY OF THE DISCLOSURE

One or more shortcomings of conventional pitch actuators are overcome, and additional advantages are provided through the pitch actuator as claimed in the present disclosure. Additional features and advantages are realized through the techniques of the present disclosure. Other embodiments and aspects of the disclosure are described in detail herein and are considered a part of the claimed disclosure.

In one non-limiting embodiment of the disclosure, a seal assembly for an actuator rod of a pitch actuator is disclosed. The assembly includes at least one first ring annularly interposed between an actuator rod and a cylinder cover. The at least one first ring is removably supported by a first split retainer half pair in an annular recess defined in the cylinder cover. Further, a first seal is annularly interposed between the actuator rod and the cylinder cover, the first seal is removably disposed adjacent to the first split retainer half pair in the annular recess. Then, a second seal is annularly interposed between the actuator rod and the cylinder cover, with the second seal removably supported by a retainer in the annular recess. The second seal is axially spaced from the first seal by a second split retainer half pair accommodated in the annular recess. A wiper seal is annularly interposed between the actuator rod and the cylinder cover, the wiper seal is removably supported by a third split retainer half pair detachably secured to a sleeve portion of the cylinder cover. Each of the first split retainer half pair, the second split retainer half pair, and the retainer is removably connectable to an end portion of the annular recess in the cylinder cover.

In an embodiment of the disclosure, the assembly includes a guide ring annularly interposed between the end portion a of the cylinder cover and the actuator rod. The guide ring is removably supported in a groove a defined in the end portion.

In an embodiment of the disclosure, the second split retainer half pair is removably fastened to the end portion of the cylinder cover through the first split retainer half pair, and the retainer is removably fastened to the end portion of the cylinder cover through the second split retainer half pair and the first split retainer half pair.

In an embodiment of the disclosure, each of the first split retainer half pair, the third split retainer half pair, and the retainer is defined with at least one groove on an inner circumferential portion to accommodate each of the at least one first ring, wiper seal, and the second seal, respectively.

In an embodiment of the disclosure, the assembly includes an O-ring removably accommodated between the second seal and the retainer, wherein at least a portion of the O-ring is enclosed by a retainer groove defined on an inner circumferential portion of the retainer.

In an embodiment of the disclosure, the cylinder cover is defined with a port configured to be in fluid communication with the annular groove, and the third split retainer half pair is removably fastened to the sleeve portion of the cylinder cover.

In another non-limiting embodiment of the disclosure, a blade pitch actuator for a wind turbine is disclosed. The blade pitch actuator including a cylinder and an actuator rod movably disposed in the cylinder. The actuator rod is structured to reciprocate within the cylinder to adjust a pitch angle of a blade of the wind turbine. Further, the actuator includes a cylinder cover enclosing an open end of the cylinder and a seal assembly. The seal assembly includes at least one first ring annularly interposed between an actuator rod and a cylinder cover. The at least one first ring is removably supported by a first split retainer half pair in an annular recess defined in the cylinder cover. Further, a first seal is annularly interposed between the actuator rod and the cylinder cover, the first seal is removably disposed adjacent to the first split retainer half pair in the annular recess. Then, a second seal is annularly interposed between the actuator rod and the cylinder cover, with the second seal removably supported by a retainer in the annular recess. The second seal is axially spaced from the first seal by a second split retainer half pair accommodated in the annular recess. A wiper seal is annularly interposed between the actuator rod and the cylinder cover, the wiper seal is removably supported by a third split retainer half pair detachably secured to a sleeve portion of the cylinder cover. Each of the first split retainer half pair, the second split retainer half pair, and the retainer is removably connectable to an end portion of the annular recess in the cylinder cover.

In an embodiment of the disclosure, the blade pitch actuator includes a guide ring annularly interposed between the end portion of the cylinder cover and the actuator rod, the guide ring is removably supported in a groove a defined in the end portion.

In yet another non-limiting embodiment of the disclosure, a method for assembling a seal assembly in a blade pitch actuator of a wind turbine is disclosed. The method includes interposing, a guide ring, annularly between the actuator rod and an end portion the cylinder cover. The guide ring is removably supported in a groove defined in the end portion. Further, the method includes interposing, at least one first ring, annularly between the actuator rod and the cylinder cover. The at least one first ring is removably supported by a first split retainer half pair disposed within an annular recess defined in the cylinder cover. Then, the method includes interposing, a first seal, annularly between the actuator rod and the cylinder cover, the first seal is removably supported adjacent to the first split retainer half pair in the annular recess. The method further includes interposing, a second seal, annularly between the actuator rod and the cylinder cover, the second seal is removably supported by a retainer in the annular recess. The second seal is axially spaced from the first seal by a second split retainer half pair accommodated in the annular recess. Then, the method includes interposing, a wiper seal, annularly between the actuator rod and the cylinder cover, where the wiper seal is removably supported by a third split retainer half pair detachably secured to a sleeve portion of the cylinder cover.

In an embodiment of the disclosure, the method includes removably connecting each of the first split retainer half pair, the second split retainer half pair, and the retainer to the end portion of the annular recess in the cylinder cover.

In an embodiment of the disclosure, each of the first split retainer half pair, the third split retainer half pair, and the retainer is accommodated in at least one groove and defined on an inner circumferential portion of each of the at least one first ring, wiper seal, and the second seal, respectively.

In an embodiment of the disclosure, the method comprises disposing an O-ring between the second seal and the retainer, wherein at least a portion of the O-ring is enclosed by a retainer groove defined on an inner circumferential portion of the retainer.

In still another non-limiting embodiment of the disclosure, a kit for replacing the seal assembly in a wind turbine pitch actuator is disclosed. The kit has at least one of each of the guide ring, the first ring, the first seal, the second seal, the wiper seal, and the O-ring, where the kit is positioned proximal to an end of the actuator rod.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF ACCOMPANYING DRAWINGS

The novel features and characteristics of the disclosure are set forth in the appended claims. The disclosure itself, however, as well as a mode of use, further objectives, and advantages thereof, will best be understood by reference to the following detailed description of an embodiment when read in conjunction with the accompanying drawings. One or more embodiments are now described, by way of example only, with reference to the accompanying drawings wherein like reference numerals represent like elements and in which:

Figure 1:
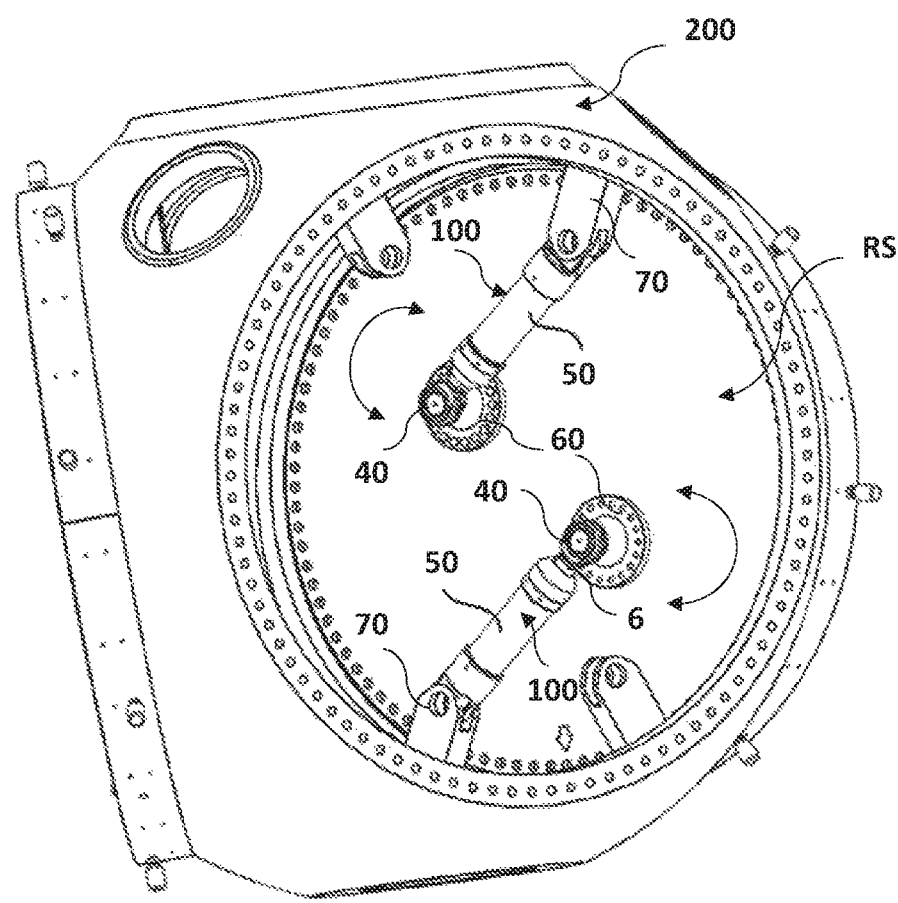
FIG. 1 illustrates a side perspective view of a hub of a wind turbine accommodating a root end section of a blade and pitch actuators, in accordance with some embodiments of the present disclosure.

The figures depict embodiments of the disclosure for purposes of illustration only. One skilled in the art will readily recognize from the following description that alternative embodiments of the pitch actuator and the seal assembly illustrated herein may be employed without departing from the principles of the disclosure described herein.

DETAILED DESCRIPTION

While the embodiments in the disclosure are subject to various modifications and alternative forms, specific embodiments thereof have been shown by way of example in the figures and will be described below. It should be understood, however, that it is not intended to limit the disclosure to the particular form disclosed, but on the contrary, the disclosure is to cover all modifications, equivalents, and alternatives falling within the scope of the disclosure.

It is to be noted that a person skilled in the art would be motivated from the present disclosure and modify various features of an assembly, a system, a device, or a method, without departing from the scope of the disclosure. Therefore, such modifications are considered to be part of the disclosure. Accordingly, the drawings show only those specific details that are pertinent to understand the embodiments of the present disclosure, so as not to obscure the disclosure with details that will be readily apparent to those of ordinary skilled in the art having benefit of the description herein. Also, the pitch actuator and the seal assembly of the present disclosure may be employed in several applications such as wind turbines, industrial systems, aircraft systems, heavy machineries and earth moving equipment, aquatic and terrestrial vehicles, and the like. However, all the sub-systems of the pitch actuator or the seal assembly are not illustrated in the drawings of the disclosure for the purpose of simplicity.

The terms "comprises . . . a", "comprising", or any other variations thereof used in the disclosure, are intended to cover a non-exclusive inclusion, such that an assembly, a system, a device, or a method comprises a list of components does not include only those components but may include other components not expressly listed or inherent to such an assembly, a system, a device, or a method. In other words, one or more elements in the assembly, the system, the device, or the method proceeded by "comprises . . . a" does not, without more constraints, preclude the existence of other elements or additional elements in the assembly, the system, the device, or the method.

Embodiments of the present disclosure disclose a seal assembly for a wind turbine pitch actuator, a method for assembling a seal assembly in a wind turbine pitch actuator, and a pitch actuator for controlling pitch angles of a wind turbine blade. Throughout the description and claims, the pitch actuator is simply referred to as an "actuator", and the actuator rod is interchangeably referred to as a "piston". The pitch actuator and the seal assembly of the present disclosure are configured to optimize or ease the replacement of parts/elements constituting the seal assembly, thereby minimizing overall idle time of the turbine, as well as tediousness and expenses involved in said replacement.

The pitch actuator and the seal assembly discussed in the embodiments of the present disclosure serve to alleviate some of the shortcomings stated in the background, and to optimize or ease the replacement of parts constituting the seal assembly, and the pitch actuator as a whole. The seal assembly includes at least one first ring annularly interposed between an actuator rod and a cylinder cover. The at least one first ring is removably supported and held on to the actuator rod by a first split retainer half pair. The first split retainer half pair is removably positioned in an annular recess defined in the cylinder cover, such that the first split retainer half pair may be split apart to provide access to the at least one first ring. The seal assembly also has a guide ring annularly interposed between an end portion of the actuator cylinder cover and the actuator rod, with the guide ring being removably supported in a groove defined in the end portion of the cylinder. The guide ring may be located adjacent to the at least one first ring on one side. The seal assembly then includes a first seal that is annularly interposed between the actuator rod and the cylinder cover. The first seal is removably disposed adjacent to the first split retainer half pair on the side opposite to that of the guide ring inside the annular recess.

Further, the seal assembly includes a second seal which is annularly interposed between the actuator rod and the cylinder cover, with the second seal removably supported by a retainer in the annular recess. In an embodiment of the disclosure, an O-ring may be removably accommodated between the second seal and the retainer, with at least a portion of the O-ring being enclosed by a retainer groove defined in an inner circumferential portion of the retainer. The second seal may be axially spaced from the first seal by a second split retainer half pair accommodated in the annular recess. The seal assembly also includes a wiper seal which may be annularly interposed between the actuator rod and the cylinder cover. The wiper seal is removably supported by a third split retainer half pair detachably secured to a sleeve portion of the cylinder cover. Each of the first split retainer half pair, the second split retainer half pair, and the retainer is assembled such that they may be removably connectable to an end portion of the annular recess in the cylinder cover. In an embodiment of the disclosure, each of the first split retainer half pair, the third split retainer half pair, and the retainer is defined with at least one groove in an inner circumferential portion to accommodate each of the at least one first ring, wiper seal, and the second seal, respectively. In another embodiment, the second split retainer half pair is removably fastened to the end portion of the cylinder cover through the first split retainer half pair, and the retainer is removably fastened to the end portion of the cylinder cover through the second split retainer half pair and the first split retainer half pair. The cylinder cover may be defined with a port which may be in fluid communication with the annular recess for the purpose including, but not limited to lubrication of the seal assembly.

Embodiments of the present disclosure also disclose a blade pitch actuator for a wind turbine for the purpose of regulating pitch angle of the blade. The pitch actuator has a cylinder and an actuator rod (like a piston) which may be movably positioned inside the cylinder. The actuator rod is structured to reciprocate inside the cylinder so that the reciprocating motion may be transformed into rotary motion of the root end section of the blade, and therefore, the entire blade for pitching. In an embodiment, the transformation of reciprocating motion of the actuator rod into rotary motion of the blade (root end section) may be attained through intermediate linkages. The cylinder also includes a cover at the extremity to enclose or conceal an open end of the cylinder, with the actuator rod projecting out of the cylinder and the cylinder cover during operation. The cylinder cover serves as an enclosure or a housing which accommodates the seal assembly discussed in the above paragraphs. In an embodiment of the disclosure, the wind turbine having the pitch actuator with seal assembly will also include a kit for replacing the seal assembly. The kit may have at least one of each of the guide ring, the first seal, the second seal, the O-ring, and the wiper seal. In an embodiment, the kit may be placed proximal or substantially proximal to the actuator rod end.

In some embodiments of the disclosure, a method for assembling a seal assembly in a blade pitch actuator of a wind turbine is disclosed. The method includes interposing, a guide ring, annularly between the actuator rod and an end portion the cylinder cover. The guide ring is removably supported in a groove defined in the end portion. Further, the method includes interposing, at least one first ring, annularly between the actuator rod and the cylinder cover. The at least one first ring is removably supported by a first split retainer half pair disposed within an annular recess defined in the cylinder cover. Then, the method includes interposing, a first seal, annularly between the actuator rod and the cylinder cover, the first seal is removably supported adjacent to the first split retainer half pair in the annular recess. The method further includes interposing, a second seal, annularly between the actuator rod and the cylinder cover, the second seal is removably supported by a retainer in the annular recess. The second seal is axially spaced from the first seal by a second split retainer half pair accommodated in the annular recess. Then, the method includes interposing, a wiper seal, annularly between the actuator rod and the cylinder cover, where the wiper seal is removably supported by a third split retainer half pair detachably secured to a sleeve portion of the cylinder cover. In an embodiment of the disclosure, the method may include step of removably connecting each of the first split retainer half pair, the second split retainer half pair, and the retainer to the end portion of the annular recess in the cylinder cover. In another embodiment, The following paragraphs describe the present disclosure with reference to FIGS. 1 to 4. In the figures, the same element or elements which have similar functions are indicated by the same reference signs. With general reference to the drawings, a pitch actuator for a wind turbine is designated with the reference numeral (100). The exterior of the pitch actuator (100) may be shown operatively without explicit illustration or explanation of all the innate components, for example, fluid chamber(s), clearances, lubrication lines, etc.

The following detailed description is merely exemplary in nature and is not intended to limit application and uses. Further, there is no intention to be bound by any theory presented in the preceding background or summary or the following detailed description. It is to be understood that the disclosure may assume various alternative orientations and step sequences, except where expressly specified to the contrary. It is also to be understood that the specific devices or components illustrated in the drawings and described in the following specification are simply exemplary embodiments of the inventive concepts defined in the appended claims. Hence, specific dimensions or other physical characteristics relating to the embodiments that may be disclosed are not to be considered as limiting, unless the claims expressly state otherwise. Hereinafter, preferred embodiments of the present disclosure will be descried referring to the accompanying drawings. While some specific terms of "upper," "lower," "below", "above", "right," or "left", "on", "under", "front", "behind" and other terms containing these specific terms and directed to a specific direction will be used, the purpose of usage of these terms or words is merely to facilitate understanding of the present invention referring to the drawings. Accordingly, it should be noted that the meanings of these terms or words should not improperly limit the technical scope of the present invention.

For the purposes of promoting an understanding of the principles of the present disclosure, reference will now be made to the embodiments illustrated in the drawings and specific language will be used to describe the same. It will nevertheless be understood that no limitation of the scope of the disclosure is thereby intended, such alterations and further modifications in the illustrated device, and such further applications of the principles of the disclosure illustrated therein being contemplated as would normally occur to one skilled in the art to which the disclosure relates.

FIG. 1 illustrates an embodiment of the present disclosure which portrays side perspective view of a hub (200) of a wind turbine [not shown] accommodating a root end section (RS) of a blade [not shown], along with one or more pitch actuators (100). The components such as a nacelle, tower, blades etc., in a typical horizontal axis wind turbine (HAWT) are well known in the art and are not discussed in detail in the present disclosure. The hub (200), as shown, may removably secure one or more [typically three] root end sections (RS) of one or more blades to form a rotor [not shown] of the wind turbine. The connection between the root end section (RS) and the hub (200) is such that the blades can be turned or pitched relative to the hub (200) for the purpose of orienting the (airfoil profiled) blades into or away from the wind. This is necessary in order to optimize the lift forces acting on the blade, since wind characteristics such as speed, direction, etc., fluctuate from time to time in a given area. This in turn is beneficial in regulating the wind turbine torque and rotational speed well within the rated limits. Apart from optimizing the lift forces, pitching serves as a measure of emergency braking to orient the blades away from the wind or to a direction where the blades experience minimal lift forces, so that under extreme wind speeds, the net lift force acting on the blade is negligibly small or close to zero. This way, under extreme wind speed conditions, pitching of blades saves the blades from undergoing extreme aerodynamic stresses, fatigue and sudden or eventual failure. Pitching of blades also facilitates feathering of blades where the blades are turned parallel to the incident airflow, so that unwanted torque acting on the rotor is reduced in the event of wind gusts.

As shown in FIG. 1, pitching of blades is attained through one or more pitch actuators (100) whose one end is fixed to the hub (200) body through a link (70). The link (70) may allow angular movement of the actuator (100) relative to the hub (200) body during operation. Further, each actuator (100) may include a cylinder (50) accommodating an actuator rod (6) [best shown in FIG. 2] capable of reciprocating inside the cylinder (50). Each actuator rod (6) has an end (40) [best shown in FIG. 2] which may be connected to the root end section (RS) of the blade through a linkage (60), such that when the actuator rod (6) reciprocates inside the cylinder (50), the root end section (RS) of the blade exhibits angular displacement (motion) due to relative constraints between connected parts. For instance, when the actuator rods (6) of both the actuators (100) extend in a direction away from the links (70), the relative constraints may cause the root end section (RS) to exhibit angular displacement in counter-clockwise direction. On the other hand, when the actuator rods (6) retract inside the cylinders (50), the root end section (RS) may undergo clockwise angular displacement. Thus, pitching of blades to attain various positive and negative angles of attack may be regulated by the extent by which the actuator rod (6) extends or retracts inside the cylinder (50). The angular displacements are indicated by the double headed arrows. In an embodiment, the actuators (100) may be electric actuators or hydraulic actuators, although embodiments of the present disclosure depict hydraulic actuators for the sake of illustration.

Figure 2:
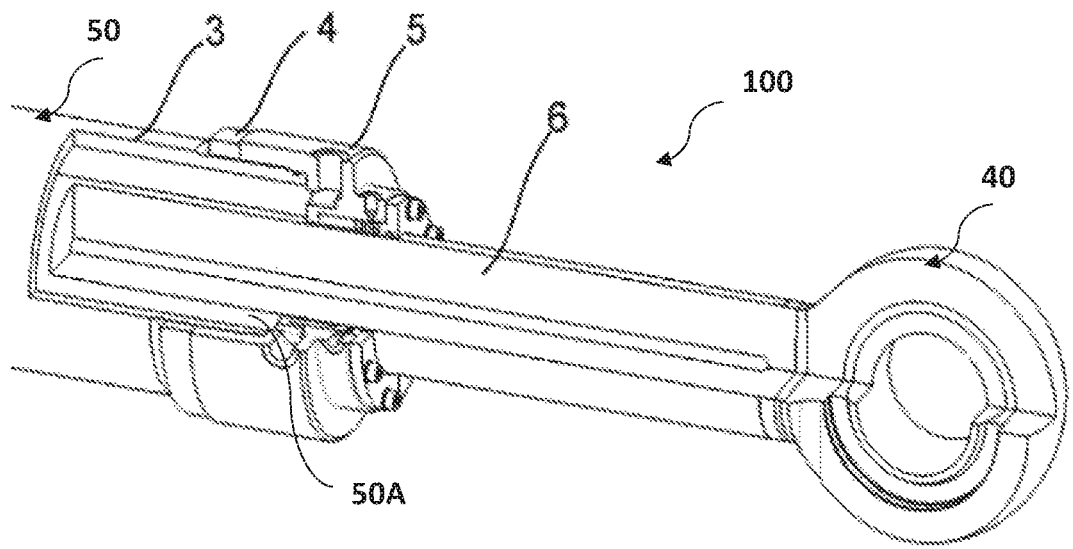
FIG. 2 illustrates a sectional perspective view of the pitch actuator of FIG. 1 along with the actuator cylinder, cylinder cover and actuator rod, in accordance with some embodiments of the present disclosure.

Reference is now made to FIG. 2 which illustrates a sectional perspective view of the pitch actuator (100) along with the actuator cylinder (50), cylinder cover (5) and the actuator rod (6), in accordance with some embodiments of the present disclosure. As shown in FIG. 2, the actuator cylinder (50) may have a body (3) in the form of a hollow shell or tube to accommodate the actuator rod (6) and other components within. The extremity or an open end (50A) of the cylinder (50) may be provided with a cover (5) which may be locked relative to the open end (50A) using a lock nut (4). The cover (5) may enclose components/elements constituting the seal assembly (30), as shown in FIG. 3, which is described in detail below.

Figure 3:
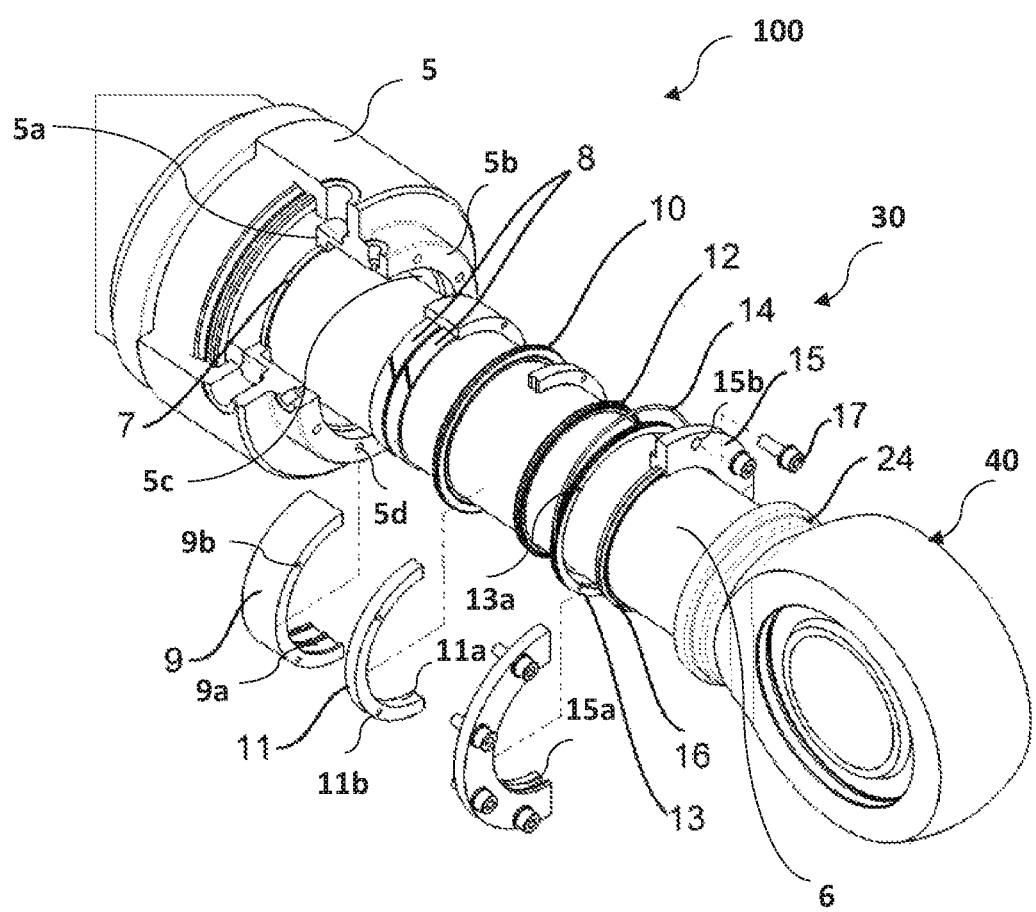
FIG. 3 illustrates sectional perspective view of a cylinder cover and an actuator rod of FIG. 2 with the elements of seal assembly partly in assembled and exploded conditions, according to some embodiments of the present disclosure.
Figure 4:
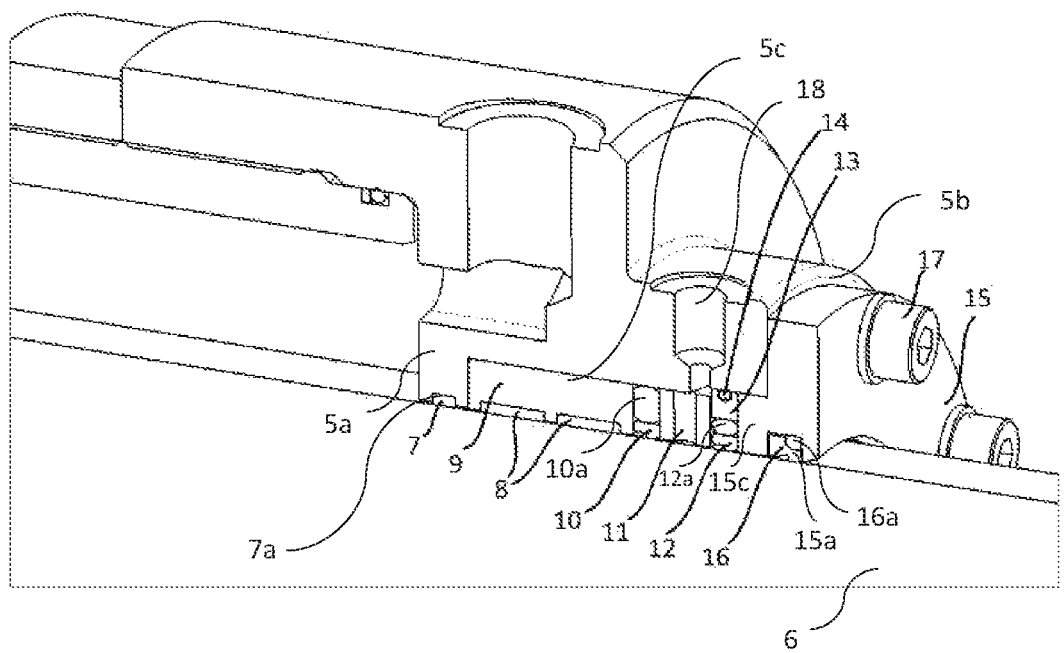
FIG. 4 illustrates a sectional perspective view of the actuator cover of FIG. 3 with the elements of the seal assembly in fully assembled condition.

FIG. 3 illustrates sectional perspective view of the cylinder cover (5) and the actuator rod (6) of FIG. 2 along with the seal assembly (30) of the present disclosure. Reference is also made to FIG. 4 which illustrates a sectional perspective view of the actuator cover (5) containing the seal assembly (30) in fully assembled condition. The seal assembly (30) discussed in the embodiments of the present disclosure serve to at least facilitate smooth, frictionless operation of the actuator rod (6) within the cylinder (50). The seal assembly (30) may also take part in preventing undesired leakage of the fluids by ensuring fluid-tight connectivity between various components in the actuator (100). A shown in FIG. 3, the seal assembly (30) may include a guide ring (7) annularly interposed between an end portion (5a) of the cylinder cover (5) and the actuator rod (6). The guide ring (7) is intended to keep the actuator rod (6) in-line or concentric with the cylinder (50), and thereby prevents metal to metal contact between the actuator rod (6) and the cylinder cover (5) and/or the cylinder (50). The guide ring (7) may be removably supported in a groove (7a) [see FIG. 4] defined in the end portion (5a) of the cover (5). In an embodiment, the guide ring (7) may be manufactured using an elastomeric material selected from a class of polymers like Nitrile (Buna), Neoprene, Ethylene Propylene (EPDM Rubber), Silicone, Fluorocarbon (Viton), and PTFE (Teflon) and combinations thereof. During replacement of any component of the seal assembly (30), the presence of guide ring (7) in the groove (7a) is always ensured. Further, the seal assembly (30) includes at least one first ring (8) annularly interposed between the actuator rod (6) and the cylinder cover (5). The at least one first ring (8) is removably gripped or sprung on to the actuator rod (6) and is held in desired position on the actuator rod (6) using a first split retainer half pair (9), as shown in FIG. 3.

The first split retainer half pair (9) may be removably positioned in at least a portion of an annular recess (5c) defined in the cylinder cover (5). In an embodiment, the first split retainer half pair (9) may abut laterally with the end portion (5a) of the cylinder cover (5) in the assembled condition. The configuration of the first split retainer half pair (9) may be such that it may be readily split apart to have access to the at least one first ring (8). In an embodiment, the first split retainer half pair (9) may have one or more grooves (9a) defined in an inner circumferential portion to accommodate each of the at least one first ring (8). In another embodiment, the at least one first ring (8) may be elastically stretched or expanded until it is positioned at an appropriate axial location on the actuator rod (6), and then may be released so that it grasps or grips the slidable actuator rod (6). The first split retainer half pair (9) are then removably assembled over the at least one first ring (8) such that the at least one first ring (8) may be seated in the grooves (9a) of the first split retainer half pair (9). In an embodiment, the first split retainer half pair (9) may be secured to the end portion (5a) by means, including, but not limited to fastening. The first split retainer half pair (9) may include provisions such as holes (9b) to facilitate the fastening. In an embodiment, the first ring (8) together with the guide ring (7) may take part in aligning and guiding the actuator rod (6) concentrically relative to the cylinder (50).

The seal assembly (30) then includes a first seal (10) that is annularly interposed between the actuator rod (6) and the cylinder cover (5) adjacent to the first split retainer half pair (9). The first seal (10) may have an integral energizer portion (10a) [best shown in FIG. 4] intended to maintain necessary pre-tension on the first seal (10) in the absence of external pressure. In an embodiment, the first seal (10) and the energizer portion (10a) may be manufactured using different materials so as to have different properties, including, but not limited to physical and mechanical properties. In an embodiment, the first seal (10) together with the energizer portion (10a) may be interposed such that the energizer portion (10a) may form a fluid tight, leak proof joint with at least a portion of the annular recess (5c), while the first seal (10) grips onto a portion of the actuator rod (6). Further, the seal assembly (30) includes a second seal (12) which may be annularly interposed between the actuator rod (6) and the cylinder cover (5), as shown in FIG. 4. The second seal (12) may be axially spaced from the first seal (10) by means of a second split retainer half pair (11). As shown in FIG. 4, the second split retainer half pair (11) may be disposed on the actuator rod (6) such that it may be sandwiched between the first seal (10) and the second seal (12) in the axial direction of the actuator rod (6). In an embodiment, the second split retainer half pair (11) may be removably fastened to the end portion (5a) of the cylinder cover (5) through the first split retainer half pair (9). To facilitate this, the second split retainer half pair (11) may have provisions (11b) coinciding with the provisions (9b) of the first split retainer half pair (9). In another embodiment, the second split retainer half pair (11) may optionally have a groove (11a) defined in an inner circumferential surface to optionally accommodate a seal [not shown]. In yet another embodiment, the second split retainer half pair (11) may take part in laterally supporting the first seal (10) against the first split retainer half pair (9), as well as to removably grip or support the first seal (10) on the actuator rod (6).

The second seal (12), as shown in FIG. 4 may be gripped or supported on the actuator rod (6) using a retainer (13). The retainer (13) may be of a single piece configuration, or of split type like other split retainers. The second seal (12) may be removably supported on the actuator rod (6) by the retainer (13) in the annular recess (5c) such that the second seal (12) may be annularly interposed or sandwiched between the retainer (13) and the actuator rod (6). In an embodiment of the disclosure, an O-ring (14) may be removably accommodated between the second seal (12) and the retainer (13). The O-ring (14) may be positioned such that at least a portion of the O-ring (14) may remain enclosed by a retainer groove (13a) defined on an inner circumferential portion of the retainer (13). In an embodiment of the disclosure, the O-ring (14) may ensure fluid-tight leak proof connection between the second split retainer half pair (13) and the cover (5). The second seal (12), like the first seal (10), may include an integral energizer portion (12a) for the purpose of maintaining pre-tension in the second seal (12). In an embodiment as shown in FIG. 4, the cylinder cover (5) may be defined with a port (18) configured to be in fluid communication with the annular groove (5c) for circulating a fluid for the purposes of lubrication and cooling, among other purposes.

Referring again to FIGS. 3 and 4, it can be seen that the seal assembly (30) includes a wiper seal (16) which may be annularly disposed on the actuator rod (6). The wiper seal (16), unlike the first ring (8), the first seal (10) and the second seal (12), may be accommodated outside the annular recess (5c) of the cylinder cover (5). As shown, the wiper seal (16) may be removably supported on the actuator mcd (6) by means of a third split retainer half pair (15). The third split retainer half pair (15) may have a stepped end portion (15c) which may be received by an extremity of the annular recess (5c), such that the stepped end portion (15c) terminate the annular recess (5c) of the cover (5). The third split retainer half pair (15) may also have a flanged body with one or more provisions (15b) such as holes which may coincide with corresponding provisions (5d) defined on sleeve portion (5b) of the cover (5). This facilitates detachable connection (like fastening) between the third split retainer half pair (15) and the sleeve portion (5b) of the cover (5). In an embodiment as shown in FIG. 3, a plurality of fastening elements (17) may be used to detachably secure the third split retainer half pair (15) with the sleeve portion (5b) of the cover (5).

Further, the third split retainer half pair (15) may have an integrally defined groove (15a) on an inner circumferential region to accommodate the wiper seal (16). In an embodiment, the wiper seal (16) may have an energizer portion (16a) like the first and second seals. In an embodiment of the disclosure, the kit (24) containing a spare seal assembly (30) may be placed proximally or substantially proximal to the actuator rod end (40). Such a positioning of the kit (24) containing the spare seal assembly (30) allows immediate and ready replacement of damaged components of the existing seal assembly (30). This is beneficial in minimizing or even eliminating idle (non-operative) time of the wind turbine. The presence of split retainers (9, 11 and 15) and the retainer (13) over the seals and rings may also facilitate easy disassembly/detachment of the damaged components in the existing seal assembly (30). Thus, the kit (24) together with the split retainers (9, 11 and 15) and the retainer (13) facilitate replacement of damaged seal assembly (30) components with new seal assembly components without having to completely remove the actuator rod (6) from the cylinder (50). In an embodiment, the kit (24) may include all the seal and ring components such as the guide ring (7), the first ring (8), the first seal (10), the second seal (12), the wiper seal (16), the O-ring (14) and other elements/components of the seal assembly (30). In an embodiment, the kit (24) may include necessary tools and equipment which allow replacement of damaged seal components with the new components. In an embodiment, the spare seal assembly components in the kit (24) may be appropriately concealed using protective layers, including but not limited to protective plastic layer, for protecting the seal assembly components from environmental influences, contaminants, etc.

Now reference is made again to FIGS. 2-4 to illustrate operational embodiment of the present disclosure. The operational embodiment includes a method for replacing damaged components of an existing seal assembly (30) in the pitch actuator (100) by new components present in the kit (24). The method involves a first phase of detaching damaged component(s) of the existing seal assembly (30) from the actuator (100), which is followed by the second phase of attaching/assembling new components present in the kit (24). The first phase of the method involves unfastening all the fastening elements (17) present on the third split retainer half pair (15). Then, the third split retainer half pair (15) may be split open to have access to the damaged wiper seal (16). Damaged wiper seal (16) may be cut using a suitable tool and pulled off. This may be followed by unfastening and pulling out the retainer (13) to have access to the second seal (12) and the O-ring (14). The damaged second seal (12) and/or the O-ring (14) present in the grooves (13a) of retainer (13) may be cut or sheared off using a suitable tool. In a similar manner, the first split retainer half pair (11) may be unfastened and split open sideways into respective halves to have access to the first seal (10). Damaged first seal (10) can be cut or sheared using a suitable tool. The first split retainer half pair (9) is also unfastened and split apart in a manner similar to second and third split retainer half pairs for accessing the first ring (8). Then, the damaged one or more first rings (8) may be easily cut and removed from the actuator (100) for replacement. In an embodiment of the disclosure, the tools required for splitting apart the split retainers and the retainer may include screw drives, wrenches, pliers, Allen keys, socket wrenches, hammers, mallets, spanners, and so on.

Once the damaged component(s) are successfully detached from the actuator (100), new components are installed or positioned in the actuator (100) to restore the normal operation. The second phase of placing new components involves expanding or stretching the one or more spare first rings (8'), so that they will grip or spring on to the actuator rod (6) appropriately. Before this step, it is ensured that the guide ring (7) is annularly interposed between the actuator rod (6) and the end portion (5a) of the cylinder cover (5), such that the guide ring (7) resides inside the groove (7a) defined in the end portion (5a). Then, the first split retainer half pair (9) is positioned such that one or more spare first rings (8') are properly seated into the grooves (9a) of the first split retainer half pair (9). Then, gently push the first split retainer half pair (9) and use necessary tool to place it into the annular recess (5c) of the cylinder cover (5). The first split retainer half pair (9) may then be fastened to the end portion (5a) such that the first ring (8') remains annularly interposed between the actuator rod (6) and the cylinder cover (5). This may be followed by placing the spare first seal (10') which may be gently squeezed and gripped on the actuator rod (6) adjacent to the first split retainer half pair (9).

The second split retainer half pair (11) may be slid into the annular recess (5c) such that it may act as a spacer between the spare first seal (10') and the spare second seal (12'). This step can be done using necessary tool. The second split retainer half pair (11) may be fastened to the end portion (5a) through the first split retainer half pair (9). Thereafter, the spare second seal (12') may be gently squeezed and gripped onto the actuator rod (6) inside the annular recess (5c). This may be accompanied by stretching and placing the spare O-ring (14') into the groove (13a) of retainer (13). The spare O-ring (14') may be seated into the groove (13a) of the retainer (13) properly. Then, push the retainer (13) containing the spare second seal (12') and the spare O-ring (14') into the annular recess (5c) until it is seated on required axial portion of the actuator rod (6). The retainer (13), once in required position, may be fastened to the end portion (5a) through the first and second split retainer half pairs (9 and 11). Lastly, the spare wiper seal (16') may be squeezed and seated inside the groove (15a) of two halves of third split retainer (13). Once seated, the third split retainer (13) may be fastened to the sleeve portion (5b) of the cover (5) by applying necessary torque to the fastening elements (17).

The seal assembly and the pitch actuator discussed in the present disclosure provides a number of advantages. One of the advantages is that the spare components of the seal assembly are readily available for replacement of damaged seal assembly components. This ensures minimal or even negligible idle (non-operating) time of the wind turbine. Another advantage is that due to split type configuration of the retainers, the retainers may provide quick and easy access to remove the damaged seals and replace the damaged seals with new ones. This in turn is beneficial in replacing the damaged components without having to dismantle the actuator or remove the actuator rod from the cylinder or the cylinder from the hub of the wind turbine or the equipment on which the cylinder is mounted. Yet another advantage is the mitigation of tediousness and high expenses involved in replacing the seals as compared to existing pitch actuating systems. A still another advantage is the ease of manufacturability of the kit containing the spare seal assembly, apart from providing flexibility with respect to improved compactness and durability of the components.

EQUIVALENTS

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system) having at least one of A, B, and C" would include but not be limited to systems that have A alone, B alone, C alone, A and B together, A and C together, B and C together, and/or A, B, and C together, etc.). In those instances, where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B. and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

| Table of Reference Numerals: | |
|---|---|
| Hub of the wind turbine | 200 |
| Pitch actuator | 100 |
| Cylinder | 50 |
| Open end of the cylinder | 50A |

-continued

Table of Reference Numerals:

| | |
|---|---|
| Actuator rod end | 40 |
| Linkages | 60 |
| Links | 70 |
| Seal assembly | 30 |
| Cylinder body/shell | 3 |
| Lock nut | 4 |
| Cylinder cover | 5 |
| End portion | 5a |
| Sleeve portion | 5b |
| Annular recess | 5c |
| Provisions in the cover | 5d |
| Actuator rod(s)/Piston | 6 |
| Guide ring | 7 |
| Groove in the end portion | 7a |
| One or more first rings | 8 |
| First split retainer half pair | 9, 9' |
| Grooves in the first split retainer half pair | 9a |
| Provisions in first split retainer half pair | 9b |
| First seal | 10, 10' |
| Energizer of the first seal | 10a |
| Second split retainer half pair | 11 |
| Groove in the second split retainer half pair | 11a |
| Provisions in second split retainer half pair | 11b |
| Second seal | 12 |
| Energizer of the second seal | 12a |
| Retainer | 13 |
| Groove in the retainer | 13a |
| O-ring | 14 |
| Third split retainer half pair | 15 |
| Groove in the third split retainer half pair | 15a |
| Provisions in third split retainer half pair | 15b |
| Stepped end portion | 15c |
| Wiper seal | 16 |
| Energizer of the wiper seal | 16a |
| Fastening elements | 17 |
| Port | 18 |
| Root end section | RS |

What is claimed is:

1. A blade pitch actuator for a wind turbine, comprising:
   a cylinder;
   an actuator rod movably disposed in the cylinder, the actuator rod being structured to reciprocate within the cylinder to adjust a pitch angle of a blade of the wind turbine;
   a cylinder cover enclosing an open end of the cylinder; and
   a seal assembly, comprising:
      at least one first ring annularly interposed between the actuator rod and the cylinder cover, wherein the at least one first ring is removably supported by a first split retainer half pair in an annular recess defined in the cylinder cover,
      a first seal annularly interposed between the actuator rod and the cylinder cover, wherein the first seal is removably disposed adjacent to the first split retainer half pair in the annular recess,
      a second seal annularly interposed between the actuator rod and the cylinder cover, the second seal being removably supported by a retainer in the annular recess, wherein, the second seal is axially spaced from the first seal by a second split retainer half pair accommodated in the annular recess, and
      a wiper seal annularly interposed between the actuator rod and the cylinder cover, the wiper seal being removably supported by a third split retainer half pair detachably secured to a sleeve portion of the cylinder cover,
   wherein, each of the first split retainer half pair, the second split retainer half pair, and the retainer is removably connectable to an end portion of the annular recess in the cylinder cover.

2. The blade pitch actuator as claimed in claim 1 further comprising a guide ring annularly interposed between the end portion of the cylinder cover and the actuator rod, wherein the guide ring is removably supported in a groove defined in the end portion.

3. The blade pitch actuator as claimed in claim 1, wherein the second split retainer half pair is removably fastened to the end portion of the cylinder cover through the first split retainer half pair, and the retainer is removably fastened to the end portion of the cylinder cover through the second split retainer half pair and the first split retainer half pair.

4. The blade pitch actuator as claimed in claim 1, wherein each of the first split retainer half pair, the third split retainer half pair, and the retainer is defined with at least one groove on an inner circumferential portion to accommodate each of the at least one first ring, the wiper seal, and the second seal, respectively.

5. The blade pitch actuator as claimed in claim 1 further comprising an O-ring removably accommodated between the second seal and the retainer, wherein at least a portion of the O-ring is enclosed by a retainer groove defined on an inner circumferential portion of the retainer.

6. The blade pitch actuator as claimed in claim 1, wherein the cylinder cover is defined with a port configured to be in fluid communication with the annular recess.

7. The blade pitch actuator as claimed in claim 1, wherein the third split retainer half pair is removably fastened to the sleeve portion of the cylinder cover.

8. A method for assembling a seal assembly in a blade pitch actuator of a wind turbine, the method comprising:
   interposing, a guide ring, annularly between an actuator rod and an end portion of a cylinder cover, wherein the guide ring is removably supported in a groove defined in the end portion;
   interposing, at least one first ring, annularly between the actuator rod and the cylinder cover, wherein the at least one first ring is removably supported by a first split retainer half pair disposed within an annular recess defined in the cylinder cover;
   interposing, a first seal, annularly between the actuator rod and the cylinder cover, wherein the first seal is removably supported adjacent to the first split retainer half pair in the annular recess;
   interposing, a second seal, annularly between the actuator rod and the cylinder cover, the second seal being removably supported by a retainer in the annular recess, wherein, the second seal is axially spaced from the first seal by a second split retainer half pair accommodated in the annular recess; and
   interposing, a wiper seal, annularly between the actuator rod and the cylinder cover, wherein the wiper seal is removably supported by a third split retainer half pair detachably secured to a sleeve portion of the cylinder cover.

9. The method as claimed in claim 8 further comprising removably connecting each of the first split retainer half pair, the second split retainer half pair, and the retainer to the end portion of the annular recess in the cylinder cover.

10. The method as claimed in claim 8, wherein each of the first split retainer half pair, the third split retainer half pair, and the retainer is defined with at least one groove on an inner circumferential portion to accommodate each of the at least one first ring, the wiper seal, and the second seal, respectively.

11. The method as claimed in claim 8 further comprising disposing an O-ring between the second seal and the retainer, wherein at least a portion of the O-ring is enclosed by a retainer groove defined on an inner circumferential portion of the retainer.

12. The blade pitch actuator as claimed in claim 1 further comprising a kit for replacing the seal assembly of the blade pitch actuator, the kit including a guide ring, a replacement at least one first ring, a replacement first seal, a replacement second seal, a replacement wiper seal, and an O-ring, the kit being positioned proximal to an end of the actuator rod.

* * * * *